(12) United States Patent
Yamada et al.

(10) Patent No.: US 12,066,305 B2
(45) Date of Patent: Aug. 20, 2024

(54) ELECTRODE STRUCTURE AND GRIP SENSOR

(71) Applicant: Panasonic Intellectual Property Management Co., Ltd., Osaka (JP)

(72) Inventors: Takumi Yamada, Osaka (JP); Takateru Sawada, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 134 days.

(21) Appl. No.: 17/830,024

(22) Filed: Jun. 1, 2022

(65) Prior Publication Data
US 2022/0388562 A1    Dec. 8, 2022

(30) Foreign Application Priority Data

Jun. 7, 2021 (JP) .................................. 2021-095421
Dec. 17, 2021 (JP) .................................. 2021-205286

(51) Int. Cl.
| G01D 5/24 | (2006.01) |
| B62D 1/04 | (2006.01) |
| B62D 1/06 | (2006.01) |
| G01L 1/14 | (2006.01) |
| G01L 5/22 | (2006.01) |

(52) U.S. Cl.
CPC ............... *G01D 5/24* (2013.01); *B62D 1/046* (2013.01); *B62D 1/06* (2013.01); *G01L 1/146* (2013.01); *G01L 5/221* (2013.01)

(58) Field of Classification Search
CPC . G01D 5/24; B62D 1/046; B62D 1/06; B62D 1/065; G01L 1/146; G01L 5/221
See application file for complete search history.

(56) References Cited

U.S. PATENT DOCUMENTS

| 2010/0101858 A1* | 4/2010 | Kato ........................ H01R 4/04 |
| | | 174/84 R |
| 2017/0079089 A1* | 3/2017 | Okazaki ................... H05B 3/18 |
| 2018/0111638 A1* | 4/2018 | Nagata .................... B26D 1/065 |
| 2018/0162308 A1 | 6/2018 | Althaus |
| 2020/0156688 A1* | 5/2020 | Tsuji ....................... B62D 1/046 |

FOREIGN PATENT DOCUMENTS

| JP | 2018-521892 A | 8/2018 |
| WO | 2016/193354 A1 | 12/2016 |

* cited by examiner

*Primary Examiner* — Akm Zakaria
(74) *Attorney, Agent, or Firm* — Seed IP Law Group LLP

(57) ABSTRACT

An electrode structure includes: a base material; a conductive fabric on a first surface of the base material; and one or more conductive wires on a second surface of the base material so as to be electrically insulated from the conductive fabric. The second surface is opposite to the first surface of the base material. The base material includes: a first area and a second area. The first area is fitted into a groove of the rim and the second area is placed in a part of a rim of a steering wheel other than the groove, when the base material is attached to the rim. The one or more conductive wires are arranged at a lower wiring density in the first area than in the second area.

10 Claims, 10 Drawing Sheets

ELECTRODE STRUCTURE AND GRIP SENSOR

CROSS REFERENCE TO RELATED APPLICATIONS

The present application is based on and claims priority of Japanese Patent Application No. 2021-095421 filed on Jun. 7, 2021, and Japanese Patent Application No. 2021-205286 filed on Dec. 17, 2021.

FIELD

The present disclosure relates to an electrode structure used for a capacitive grip sensor, and the grip sensor.

BACKGROUND

Patent Literature (PTL) 1 discloses a steering wheel for a vehicle including a capacitive detection system. The capacitive detection system is used to detect a hand of the driver on the steering wheel. The capacitive detection system includes a capacitive detection device including a conductive wire at least partially attached to the circumferential edge of the steering wheel, and a conductive layer partially overlapping the conductive wire.

CITATION LIST

Patent Literature

PTL 1: Unexamined Patent Application Publication (Translation of PCT Application) No. 2018-521892

SUMMARY

There is a room for improvement in the capacitive detection device (i.e., an electrode structure) described in PTL 1.

The present disclosure provides an improved electrode structure and an improved grip sensor.

An electrode structure according to an aspect of the present disclosure includes: a base material; a conductive fabric on a first surface of the base material; and one or more conductive wires on a second surface of the base material so as to be electrically insulated from the conductive fabric, the second surface being opposite to the first surface of the base material. The base material includes a first area and a second area, the first area being fitted into a groove of a rim of a steering wheel and the second area being placed in a part of the rim other than the groove when the base material is attached to the rim. The one or more conductive wires are arranged at a lower wiring density in the first area than in the second area.

A grip sensor according to an aspect of the present disclosure includes: the electrode structure; and a control circuit section that detects a change in a capacitance generated in accordance with the conductive fabric.

The electrode structure and the grip sensor according to the present disclosure has an improvement from the background art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1A:
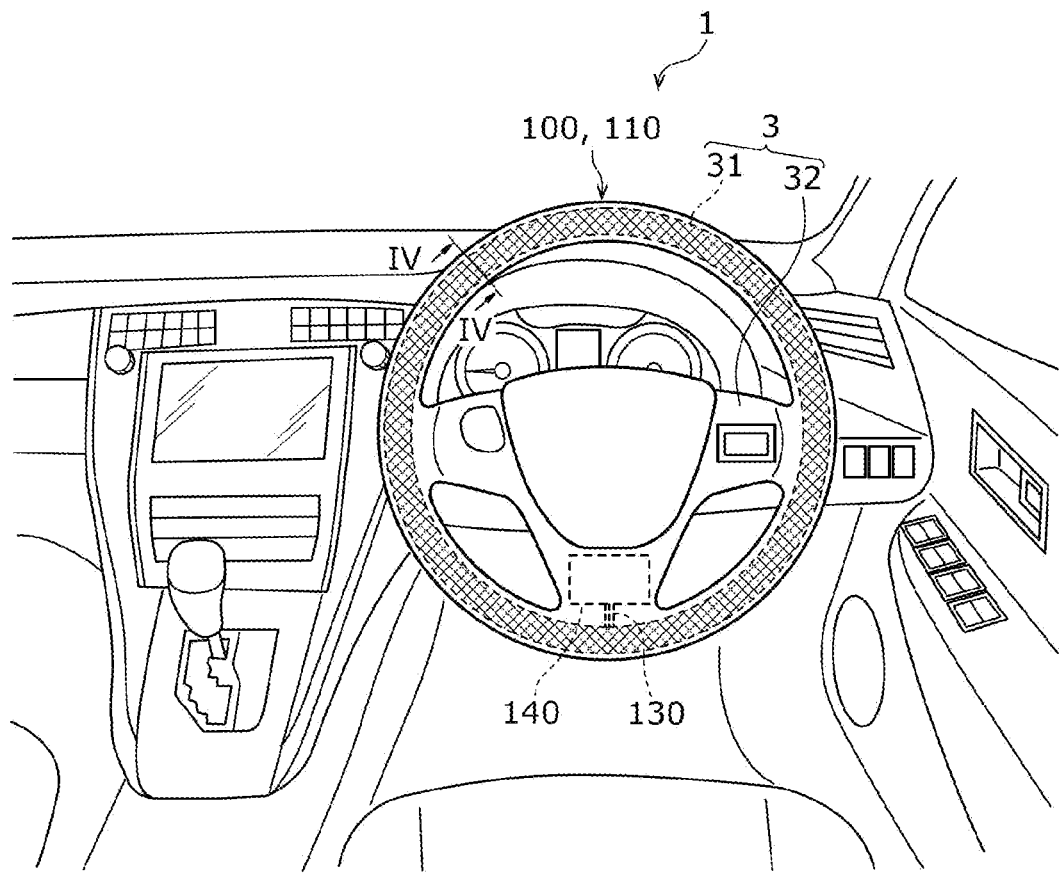
FIG. 1A shows an example of a vehicle cabin in which a grip sensor according to an embodiment is placed.

The capacitive detection device (i.e., the electrode structure) disclosed in PTL 1 is attached to a rim of the steering wheel. The rim has a groove into which a part of the capacitive detection device is fitted to reduce the displacement of the capacitive detection device. In this case, there may be a demand for reducing a mechanical load applied onto the conductive layer (or a conductive fabric) by the conductive wire pressed into the groove.

To meet the demand, the present disclosure provides an electrode structure and a grip sensor that reduce a mechanical load applied onto a conductive fabric by a conductive wire, when being attached to a rim of a steering wheel.

An electrode structure according to an aspect of the present disclosure includes: a base material; a conductive fabric on a first surface of the base material; and one or more conductive wires on a second surface of the base material so as to be electrically insulated from the conductive fabric, the second surface being opposite to the first surface of the base material. The base material includes a first area and a second area, the first area being fitted into a groove of a rim of a steering wheel and the second area being placed in a part of the rim other than the groove when the base material is attached to the rim. The one or more conductive wires are arranged at a lower wiring density in the first area than in the second area.

This configuration reduces the number of the conductive wires inside the groove, when the electrode structure is attached to the rim of the steering wheel. In the groove, the conductive fabric is less compressed between the conductive wires and the surface layer by the conductive wires. This reduces the mechanical load applied onto the conductive fabric by the conductive wires easily.

In the electrode structure according to another aspect of the present disclosure, when the base material is attached to the rim, the first area includes: a third area on an outer circumference of the rim; and a fourth area on an inner circumference of the rim. The one or more conductive wires are arranged at a lower wiring density in the third area than in the fourth area.

This configuration further reduces the number of the conductive wires inside the groove in the area in which the conductive fabric is relatively concentrated. This reduces the mechanical load applied onto the conductive fabric by the conductive wires more easily.

In the electrode structure according to yet another aspect of the present disclosure, when the base material is attached to the rim, the third area includes an apex forward of the rim and another apex rearward of the rim.

This configuration further reduces the number of the conductive wires inside the groove in the area which is opposed to a large part of a palm of a vehicle driver holding the rim and in which the conductive fabric is relatively concentrated. This reduces the mechanical load applied onto the conductive fabric by the conductive wires more easily.

In the electrode structure according to still another aspect of the present disclosure, when the base material is attached to the rim, conductive fabrics each being the conductive fabric on both sides of the groove are connected in the third area but not in the fourth area.

In this configuration, when the part corresponding to the fourth area of the base material is fitted into the groove of the rim of the steering wheel, there is no conductive fabric onto which the conductive wires apply the mechanical load. Even if there is any conductive wire inside the groove, the conductive fabric is less compressed by the conductive wire.

In the electrode structure according to further another aspect of the present disclosure, some of the one or more conductive wires pass through the fourth area and others turn up in the second area so as not to pass through the third area.

In this configuration, since there is no conductive wire in a part of the groove corresponding to the third area of the base material, no mechanical load is applied onto the conductive fabric by any conductive wire.

In the electrode structure according to still yet another aspect of the present disclosure, the one or more conductive wires are grounded. A total number of the one or more conductive wires in the first area is one.

This configuration reduces the mechanical load applied onto the conductive fabric by the conductive wires more easily.

A grip sensor according to an aspect of the present disclosure includes: the electrode structure; and a control circuit section that detects a change in a capacitance generated in accordance with the conductive fabric.

This configuration reduces the number of the conductive wires inside the groove, when the electrode structure is attached to the rim of the steering wheel. In the groove, the conductive fabric is less compressed between the conductive wires and the surface layer by the conductive wires. This reduces the mechanical load applied onto the conductive fabric by the conductive wires easily.

Now, an embodiment will be described in detail with reference to the drawings.

Note that the embodiment described below is a mere comprehensive or specific example of the present disclosure. The numerical values, shapes, materials, constituent elements, the arrangement and connection of the constituent elements, steps, step orders etc. shown in the following embodiment are thus mere examples, and are not intended to limit the scope of the present disclosure. Among the constituent elements in the following embodiment, those not recited in any of the independent claims are described as optional constituent elements.

The figures are schematic representations and not necessarily drawn strictly to scale. The scales are thus not necessarily the same in the figures. In the following embodiment, there is an expression such as "substantially T-shaped". For example, "substantially T-shaped" means not only "completely T-shaped" but also includes "substantially T-shaped" with an error of several percentages, for example. The expression "substantially T-shaped" means "T-shaped" within a range in which the present disclosure provides advantageous effects. The same applies to the other expressions with "substantial" or "substantially".

In the following embodiment, the length of the electrode structure extends along the Y-axis. The X-axis extends perpendicularly to the Y-axis on a plane parallel to the electrode structure. Along the Y-axis, one end (i.e., the left end in FIG. 2) of the electrode structure is referred to as a "negative side", whereas the other end (i.e., the right end in FIG. 2) is referred to as a "positive side". Similarly, along the X-axis, one end (i.e., the lower end in FIG. 2) of the electrode structure is referred to as a "negative side", whereas the other end (i.e., the upper end in FIG. 2) is referred to as a "positive side". In addition, the Z-axis extends perpendicularly to the plane of the electrode structure. Along the Z-axis, one side (i.e., the back on the paper in FIG. 2) is referred to as a "negative side", whereas the other side (i.e., the front on the paper in FIG. 2) is referred to as a "positive side".

Embodiment

[Configuration of Grip Sensor 100]

Figure 1B:
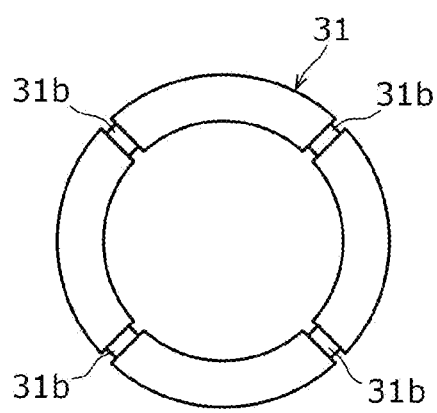
FIG. 1B is a front view showing an example of a rim of a steering wheel.

FIG. 1A shows an example of the cabin of vehicle 1 in which grip sensor 100 according to the embodiment is placed. FIG. 1B is a front view of an example of rim 31 of steering wheel 3.

As shown in FIG. 1A, vehicle 1 includes steering wheel 3, a speaker, and a display device such as a liquid crystal display. The speaker and the display device are alerting devices, for example.

Steering wheel 3 directs the steering wheel of vehicle 1 at a steering angle. Steering wheel 3 includes rim 31, substantially T-shaped spoke 32, and a horn switch cover (not shown). Spoke 32 is integral with the inner circumferential surface of rim 31. The horn switch cover covers a horn switch (not shown) at the center of spoke 32.

As shown in FIG. 1B, rim 31 has a plurality of (four in FIG. 1B) grooves 31b. Each of grooves 31b is obtained by reducing the radial size of rim 31 at a corresponding point. Grooves 31b are formed in rim 31 at an interval along the circumference of rim 31 in a plan view (i.e., when rim 31 is viewed from the front).

Grip sensor 100 is a capacitive sensor that detects a hand grip on steering wheel 3 and is included in steering wheel 3 of vehicle 1. Specifically, grip sensor 100 includes electrode structure 110, control circuit section 140, and harness 130. Electrode structure 110 is attached to rim 31 of steering wheel 3. Control circuit section 140 detects a grip based on a signal from electrode structure 110. Harness 130 electrically connects electrode structure 110 to control circuit section 140. Control circuit section 140 is embedded in spoke 32, for example. Such grip sensor 100 detects a grip on rim 31 of steering wheel 3.

[Electrode Structure 110]

Electrode structure 110 includes at least one electrode. This electrode has a capacitance that changes in accordance with whether the driver (or the user) of vehicle 1 holds rim 31 of steering wheel 3. Specifically, electrode structure 110 detects a change in the capacitance between a hand of the user and electrode structure 110 (i.e., conductive fabric 112 which will be described later) to detect whether the hand of the user touches steering wheel 3. When a hand of the user is away from steering wheel 3, electrode structure 110 detects the capacitance between core 31a (see FIG. 4) of rim 31 and conductive fabric 112. When a hand of the user is closer to or on steering wheel 3, a capacitance is generated between the hand of the user and conductive fabric 112 and changes. When the detected capacitance is greater than or equal to a predetermined value, the hand of the user is determined to touch or hold steering wheel 3.

Figure 2:
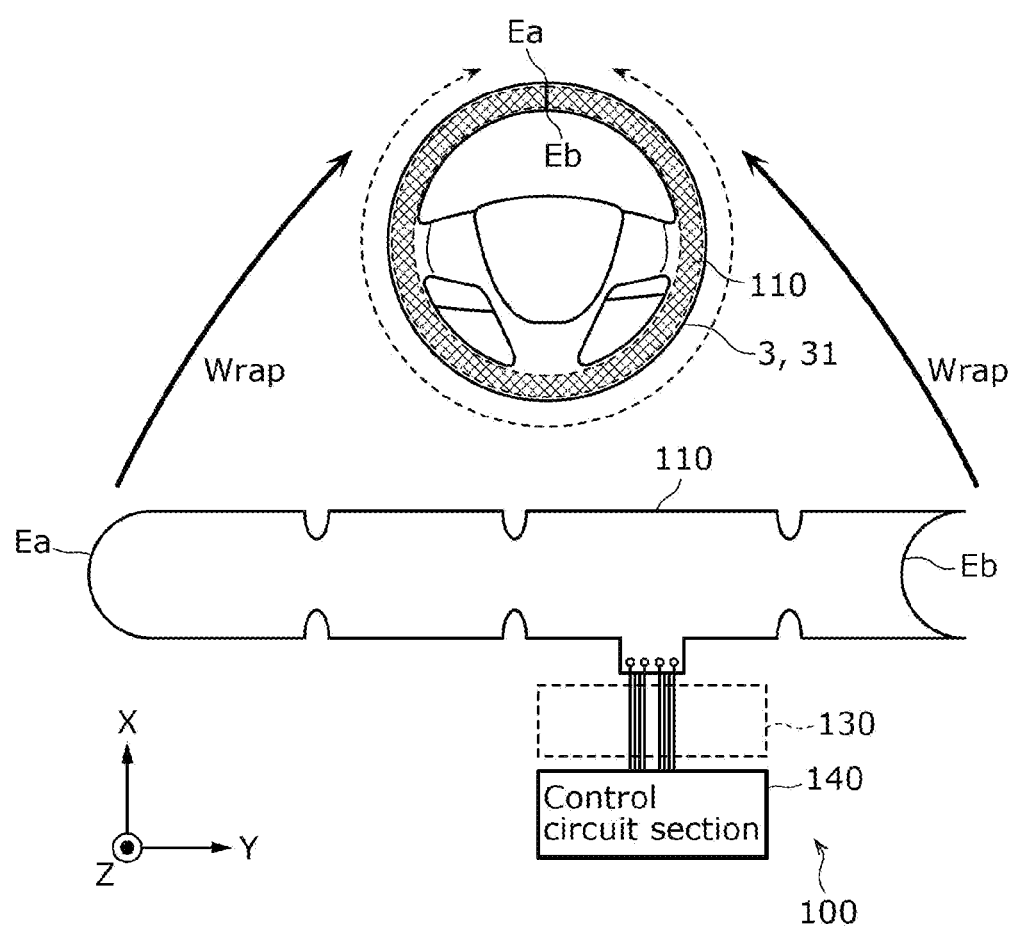
FIG. 2 shows an example of wrapping an electrode structure according to the embodiment around the rim.

FIG. 2 shows an example of wrapping electrode structure 110 of grip sensor 100 according to the embodiment around rim 31.

As shown in FIGS. 1A and 2, electrode structure 110 is, as a steering sheet, a sheet-like structure that is elastic, flexible, and ductile as a whole and in a long size. Electrode structure 110 is attached to rim 31 of steering wheel 3. At this time, electrode structure 110 is wrapped around rim 31 into a ring. Two ends Ea and Eb of electrode structure 110 are substantially opposed to each other.

Here, electrode structure 110 is wrapped around rim 31 while being stretched. Accordingly, as described above, electrode structure 110 are elastic, flexible, and ductile, and stretched as a whole, for example, by about ten percent or more.

When being wrapped around rim 31, electrode structure 110 is pressed into grooves 31b to fit each part of electrode structure 110 into one of grooves 31b. This reduces the displacement of electrode structure 110 along the circumference of rim 31 in a plan view.

Figure 3A:
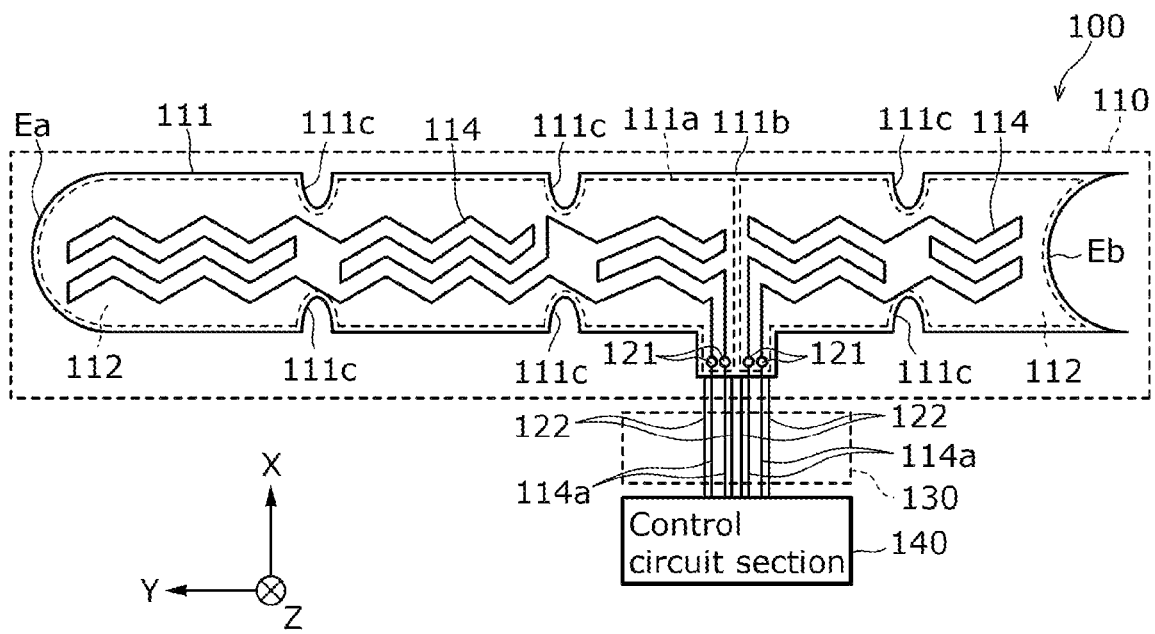
FIG. 3A is a rear view showing an example of the grip sensor according to the embodiment.
Figure 3B:
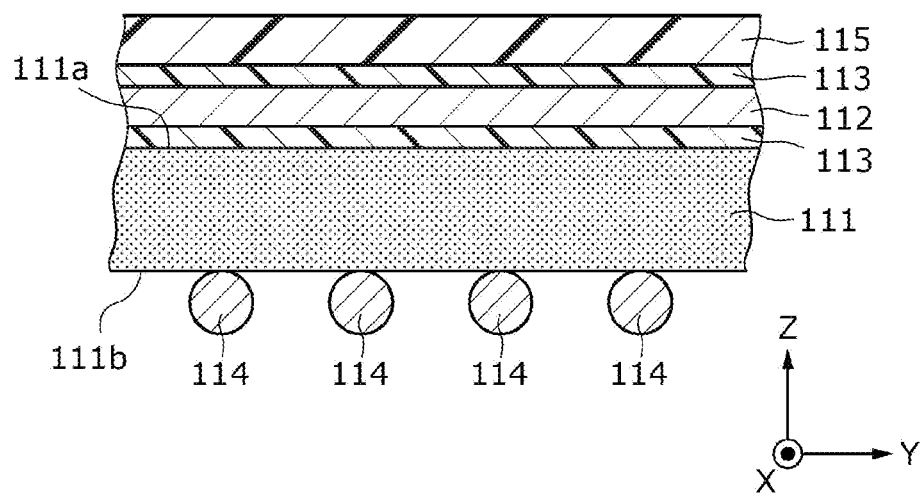
FIG. 3B is a cross-sectional view showing an example of the electrode structure according to the embodiment.
Figure 4:
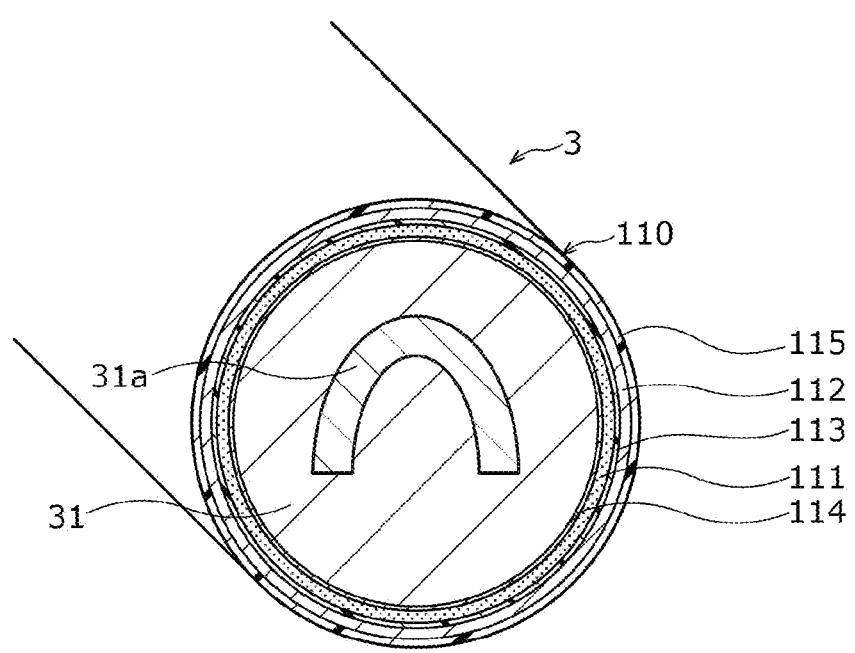
FIG. 4 is a cross-sectional view showing an example of the rim attached with the electrode structure taken along line IV-IV in FIG. 1A.

FIG. 3A is a rear view showing an example of grip sensor 100 according to the embodiment. FIG. 3B is a cross-sectional view showing an example of electrode structure 110 according to the embodiment. FIG. 4 is a cross-sectional view showing an example of rim 31 attached with electrode structure 110 taken along line Iv-Iv in FIG. 1A.

As shown in FIGS. 3A, 3B, and 4, electrode structure 110 includes base material 111, conductive fabrics 112, adhesive layers 113, conductive wires 114, surface layer 115, connecting terminals 121, and electrical wires 122.

[Base Material 111]

Base material 111 is a non-woven fabric formed into a long sheet made of an elastic, flexible, and ductile material. For example, base material 111 is made of a synthetic resin such as polyethylene (PE) or polyethylene terephthalate (PET). Base material 111 is formed in accordance with the shape and size of rim 31.

Base material 111 has first surface 111a and second surface 111b. Located above first surface 111a is conductive fabric 112 with one of adhesive layers 113 interposed therebetween. Arranged on second surface 111b are conductive wires 114. That is, base material 111 is interposed between conductive fabric 112 and conductive wires 114. First surface 111a is an example of the "first surface" of base material 111, and second surface 111b is an example of the "second surface" of base material 111 opposite to the first surface. When electrode structure 110 is wrapped around rim 31, base material 111 is fixed to rim 31 with conductive wires 114 interposed therebetween, while being stretched. When base material 111 is fixed to rim 31, second surface 111b faces rim 31 of steering wheel 3.

Base material 111 has, on two edges aligned along the width, a plurality of (three in FIG. 3A) substantially semi-circular cutouts 111c. Each part of base material 111 between two cutouts 111c along the width is fitted into one of grooves 31b of rim 31. This part corresponds to first area A1 (see FIG. 5A) which will be described later. The parts of base material 111 without any cutout 111c are wrapped around rim 31. These parts correspond to second areas A2 (see FIG. 5A) which will be described later.

In the embodiment, there are three parts (first areas A1) each being interposed between two cutouts 111c aligned along the width of base material 111. Accordingly, these three parts are fitted into three of four grooves 31b of rim 31, respectively. Fitted into the remaining one of grooves 31b are two ends Ea and Eb of electrode structure 110.

Base material 111 may be divided into a plurality of parts. In this case, conductive fabric 112 is formed on each of the parts.

[Conductive Fabric 112]

Each conductive fabric 112 is located above first surface 111a of base material 111 with one of adhesive layers 113 interposed therebetween. This adhesive layer 113 is adhered to first surface 111a. That is, each conductive fabric 112 is located on the back surface of surface layer 115 and on first surface 111a of base material 111 to be interposed between surface layer 115 and base material 111. Each conductive fabric 112 is adhered to the back surface of surface layer 115 by this adhesive layer 113, and to first surface 111a of base material 111 by another adhesive layer 113 so as to be fixed to base material 111. First surface 111a of base material 111 faces surface layer 115.

One or more conductive fabrics 112 may be formed above first surface 111a of base material 111. As shown in FIG. 3A, the embodiment will be described where electrode structure 110 includes two conductive fabrics 112 and two conductive wires 114.

[Adhesive Layer 113]

One of adhesive layers 113 is bonded to first surface 111a of base material 111 to fix conductive fabrics 112 onto first surface 111a of base material 111. This adhesive layer 113 may include an adhesive and a double-sided tape, for example. This adhesive layer 113 may be a transfer double-sided tape (without carrier). In this case, adhesive layer 113 is made only of an adhesive.

Formed on the back surface of surface layer 115 is another adhesive layer 113. This adhesive layer 113 fixes surface layer 115 onto conductive fabrics 112. This adhesive layer 113 also includes an adhesive and a double-sided tape, for example, but may be a transfer double-sided tape (without carrier) or may be made only of an adhesive.

[Conductive Wires 114]

Conductive wires 114 are metal wires (i.e., conductive wires) such as copper wires knitted to base material 111, for example. Conductive wires 114 are ground electrodes electrically connected via electrical wires 114a to control circuit section 140 and grounded. Specifically, being electrically insulated from conductive fabrics 112, conductive wires 114 are electrically connected to electrical wires 114a, which are different from electrical wires 122, and are electrically connected via electrical wires 114a to control circuit section 140.

In the embodiment, conductive wires 114 are metal wires coated with a resin, for example, that are used as heater elements. That is, the surfaces of conductive wires 114 are electrically insulated. Once control circuit section 140 causes a current to flow to conductive wires 114, conductive wires 114 are heated. With this heat, conductive wires 114 heat electrode structure 110. With electrode structure 110 heated, rim 31 of steering wheel 3 is also heated. Accordingly, the driver of vehicle 1 holds rim 31 comfortably even in a cold vehicle cabin.

Conductive wires 114 are arranged on second surface 111b, which is opposite to first surface 111a, of base material 111. Specifically, conductive wires 114 are knitted in a zigzag pattern to second surface 111b, which is opposite to first surface 111a, of base material 111. The bends of two conductive wires 114 are actually curved.

As described above, there are two conductive wires 114 in the embodiment. One (on the left in FIG. 3A) of conductive wires 114 has two ends electrically and mechanically connected to one (on the left in FIG. 3A) of a pair of connecting terminals 121. The other (on the right in FIG. 3A) of conductive wires 114 has two ends electrically and mechanically connected to the other (on the right in FIG. 3A) of the pair of connecting terminals 121.

When electrode structure 110 is wrapped around rim 31, conductive wires 114 are arranged on the surface of rim 31 and adhered to the surface of rim 31 by an adhesive (not shown). That is, conductive wires 114 are interposed between rim 31 and base material 111.

Figure 5A:
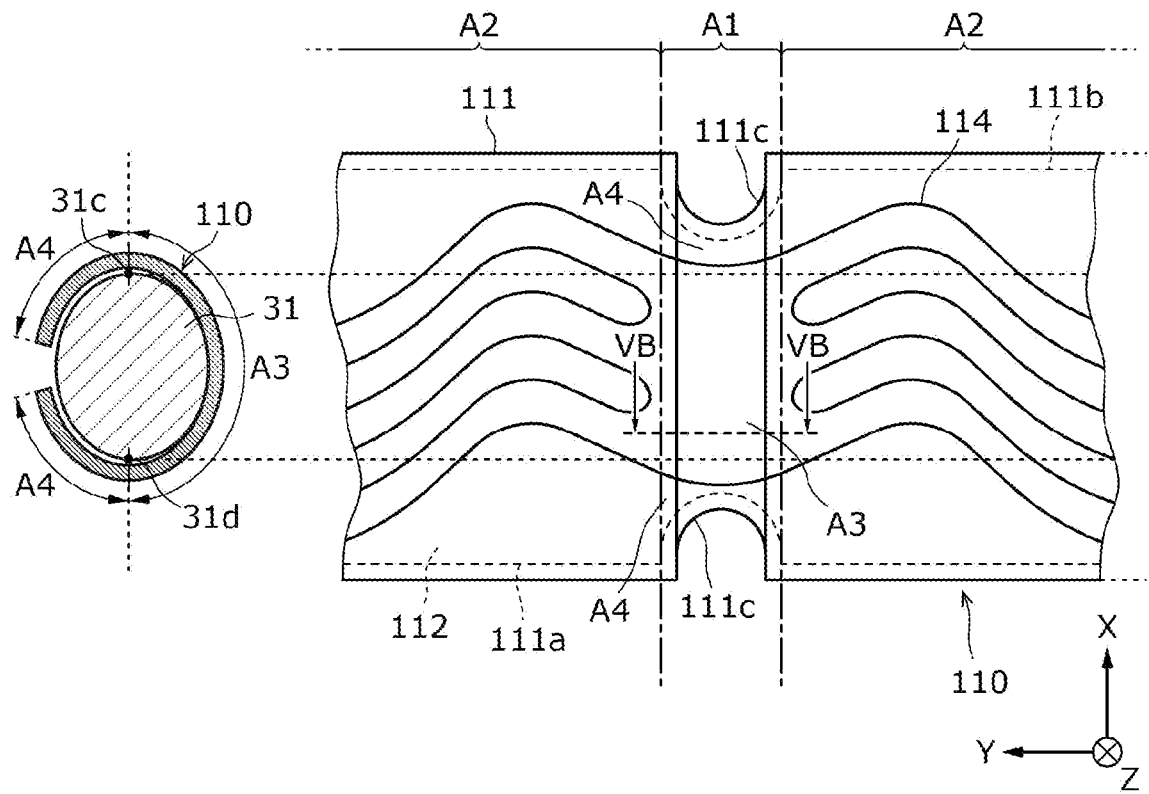
FIG. 5A is a schematic view showing a main part of the electrode structure according to the embodiment.
Figure 5B:
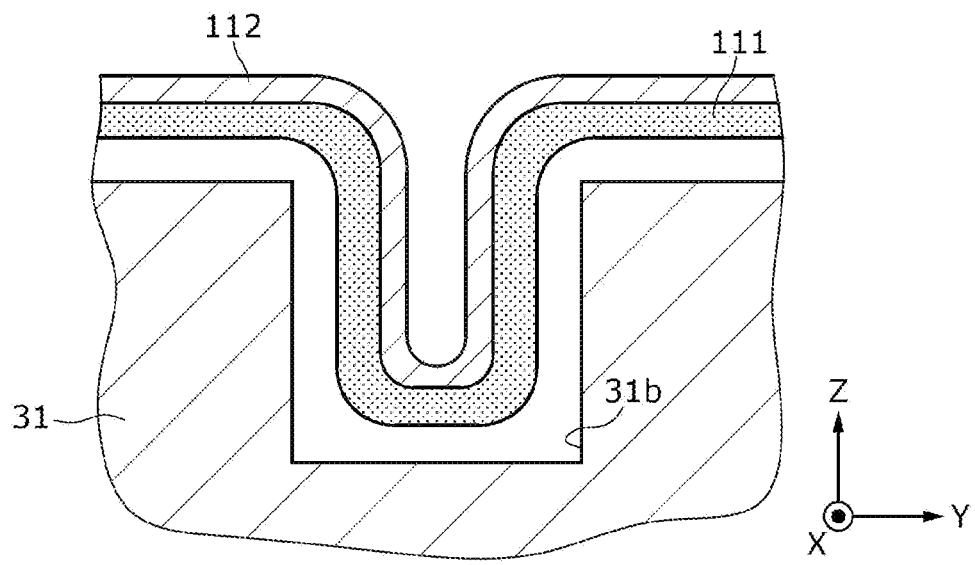
FIG. 5B is a cross-sectional view of the main part of the electrode structure taken along line VB-VB in FIG. 5A.

Now, a wire structure of conductive wires 114 will be described in detail with reference to FIGS. 5A and 5B. FIG. 5A is a schematic view showing a main part of electrode structure 110 according to the embodiment. FIG. 5B is a cross-sectional view of the main part of electrode structure 110 taken along line VB-VB in FIG. 5A. In FIG. 5B, adhesive layers 113 and surface layer 115 are not shown.

As shown in FIG. 5A, base material 111 is roughly divided into first areas A1 and second areas A2. Each first area A1 is fitted into one of grooves 31b of rim 31, when electrode structure 110 is attached to rim 31 of steering wheel 3. In the embodiment, the parts between two cutouts 111c along the width of base material 111 correspond to first areas A1. Second areas A2 are located in the parts other than grooves 31b of rim 31, when electrode structure 110 is attached to rim 31 of steering wheel 3.

On base material 111, conductive wires 114 have different wiring densities between first areas A1 and second areas A2. Specifically, conductive wires 114 are arranged in base material 111 so as to have a lower wiring density in first areas A1 than in second areas A2.

Here, the wiring density is represented by the area (i.e., the section) of conductive wires 114 per unit area of base material 111, when base material 111 is viewed along its thickness (i.e., along the Z-axis). In other words, the wiring density is represented by the number of conductive wires 114 in each area (i.e., each part) per unit area of base material 111 when base material 111 is viewed along the thickness. That is, a higher wiring density means a larger number of conductive wires 114 in the area. A lower wiring density means a smaller number of conductive wires 114 in the area.

The "number of conductive wires 114" here is the number of conductive wires 114 intersecting an imaginary line along the width (along the X-axis) of base material 111 in each area (i.e., each part) per unit area of base material 111. That is, the number of conductive wires 114 here is not necessarily equal to the number of conductive wires 114.

In the example of FIG. 5A, there are six conductive wires 114 in each of second areas A2 on the right and left sides of each first area A1, and there are two conductive wires 114 in first areas A1. That is, conductive wires 114 are arranged in first areas A1 at a lower than in second areas A2.

In the embodiment, base material 111 further includes third area A3 and fourth areas A4. When base material 111 is attached to rim 31, third area A3 is located on the outer circumference of rim 31. In other words, when base material 111 is attached to rim 31, third area A3 faces a palm of the driver of vehicle 1 holding rim 31. In other words, when base material 111 is attached to rim 31, third area A3 mainly includes a part which is stretched with a tension applied.

When base material 111 is attached to rim 31, fourth areas A4 are located on the inner circumference of rim 31. In other words, when base material 111 is attached to rim 31, fourth areas A4 face fingers of the driver of vehicle 1 holding rim 31. In further other words, when base material 111 is attached to rim 31, each fourth area A4 mainly includes a part which is not stretched with a tension applied.

In the example of FIG. 5A, when base material 111 is attached to rim 31, third area A3 includes apex 31c forward of rim 31 and apex 31d rearward of rim 31. When the driver of vehicle 1 holds rim 31, "forward of rim 31" is in direction from the driver to rim 31, and "rearward of rim 31" is in the direction from rim 31 to the driver. In other words, the "forward of rim 31" is the direction in which vehicle 1 travels forward, and the "rearward of rim 31" is in the direction in which vehicle 1 travels rearward.

Note that third area A3 may be located on the outer circumference of rim 31, when base material 111 is attached to rim 31. For example, with reference to apexes 31c and 31d of rim 31, the area may have a transverse size (i.e., along the X-axis) of tens of percent shorter or longer. That is, third area A3 may or may not include apexes 31c and 31d of rim 31.

In base material 111, conductive wires 114 are further arranged at different wiring densities between third area A3 and fourth areas A4. Specifically, conductive wires 114 are arranged in base material 111 at a lower wiring density in third area A3 than in fourth areas A4.

In the example shown in FIG. 5A, one conductive wire 114 exists in each of fourth areas A4 on and under third area A3. On the other hand, no conductive wire 114 exists in third area A3. That is, conductive wires 114 are arranged at a lower wiring density in third area A3 than in fourth areas A4.

In the embodiment, with each part corresponding to one of first areas A1 of base material 111 fitted into one of grooves 31b of rim 31 of steering wheel 3, two conductive wires 114 exists in groove 31b.

In particular, in the part of groove 31b into which the part corresponding to third area A3 of base material 111 is fitted, no conductive wire 114 exists in groove 31b as shown in FIG. 5B.

In order to achieve the wire structure of conductive wires 114 as described above, conductive wires 114 are arranged in base material 111 as shown in FIGS. 3A and 5A. Specifically, in the embodiment, two ends of each conductive wire 114 are electrically and mechanically connected to the pair of connecting terminals 121 to form a closed loop. Some conductive wires 114 then pass through (i.e., cross) fourth areas A4, and the others turn up in second areas A2 not to pass through third area A3.

[Surface Layer 115]

Surface layer 115 is touched by a hand and forms the outer circumference of grip sensor 100. That is, surface layer 115 comes into direct contact with a hand of a user when holding rim 31. Surface layer 115 may be made of leather, wood, or a resin, and is made of leather in the embodiment.

[Connecting Terminals 121 and Electrical Wires 122]

Connecting terminals 121 are ring or round solderless terminals. Connecting terminals 121 are fastened and fixed to base material 111 and conductive fabrics 112 by a fastening member.

Each electrical wire 122 has one end electrically and mechanically connected to corresponding one of connecting terminals 121, and the other end electrically connected to control circuit section 140. Electrical wires 122 are cables for electrically connecting conductive fabrics 112 to control circuit section 140, and insulating coating copper wires, for example. Being electrically connected to conductive fabrics 112, electrical wires 122 are fixed by fastening members (not shown) such as rivets.

[Control Circuit Section 140]

Control circuit section 140 is embedded in spoke 32, for example. Control circuit section 140 is electrically connected to conductive wires 114 and conductive fabrics 112, and detects a hand touch on steering wheel 3 by the driver (user 9) of vehicle 1 based on a signal transmitted from one of conductive fabrics 112. Control circuit section 140 measures a hand touch on surface layer 115 by the user. Control circuit section 140 detects whether the hand of the user touches rim 31, that is, a hand touch and the position touched by the hand.

Control circuit section 140 includes a control circuit and a power circuit.

The control circuit includes a sensor circuit that detects a contact between a human body and steering wheel 3 using conductive fabrics 112. The control circuit is electrically connected to conductive fabrics 112 so that conductive fabrics 112 detect the contact between the human body and steering wheel 3.

Specifically, the control circuit causes an AC current to flow via electrical wires 122 to two conductive fabrics 112, that is, applies a measurement potential to conductive fabrics 112. The control circuit is electrically connected to two conductive fabrics 112 by electrical wires 122. Once a hand touches surface layer 115 of rim 31, the capacitance of one of conductive fabrics 112 including the touched part changes. The control circuit thus measures the change in the capacitance of conductive fabric 112 based on the current value (i.e., the measurement potential) of the current flowing through conductive fabric 112. In other words, the control circuit (i.e., control circuit section 140) detects the change in the capacitance generated based on conductive fabric 112. Accordingly, the control circuit detects whether a hand touches steering wheel 3 based on a signal indicating a change in the capacitance and output from conductive fabric 112.

The power circuit is electrically connected via electrical wires 122 to the control circuit and controlled by the control circuit. The power circuit is electrically connected via electrical wires 122, for example, to conductive wires 114. The power circuit applies a measurement potential to conductive fabrics 112 using the control circuit.

Note that the power circuit may be controlled by the control circuit so that a DC current flows to conductive wires 114. That is, conductive wires 114 cause a DC current to flow to function as a heater. In this case, only a DC current flows to conductive wires 114 and is thus grounded as compared to the AC current flowing to conductive fabrics 112.

Comparison

Figure 6:
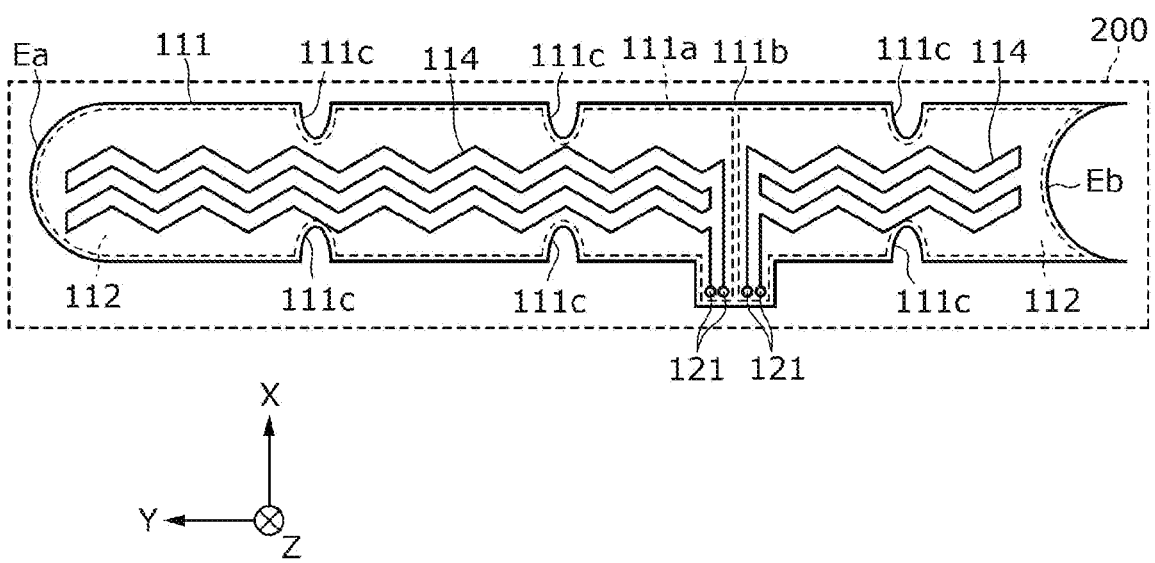
FIG. 6 is a rear view showing an electrode structure according to a comparative example.
Figure 7A:
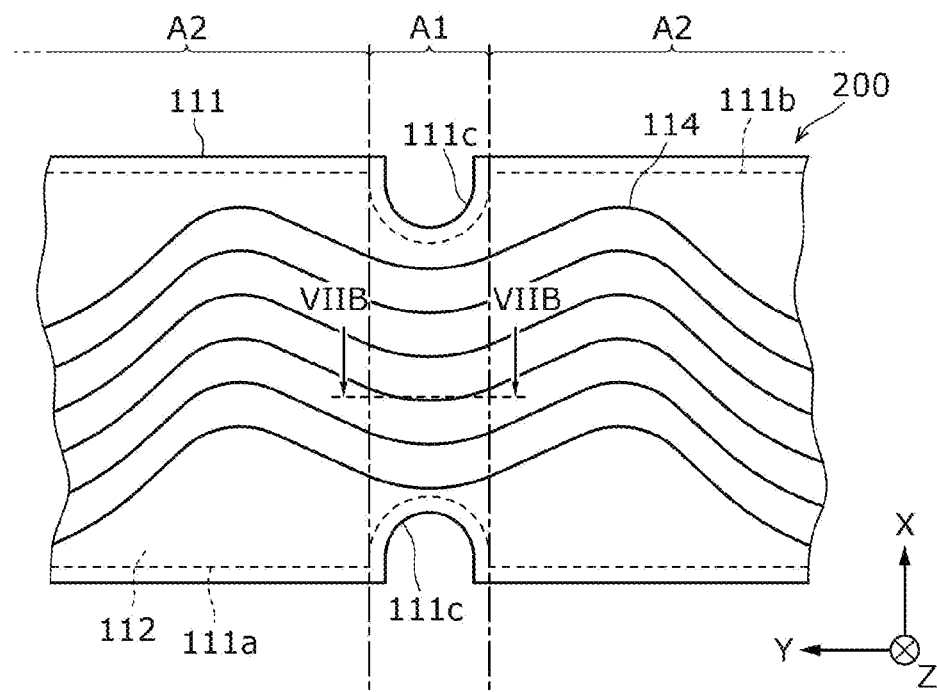
FIG. 7A is a schematic view showing a main part of the electrode structure according to the comparative example.
Figure 7B:
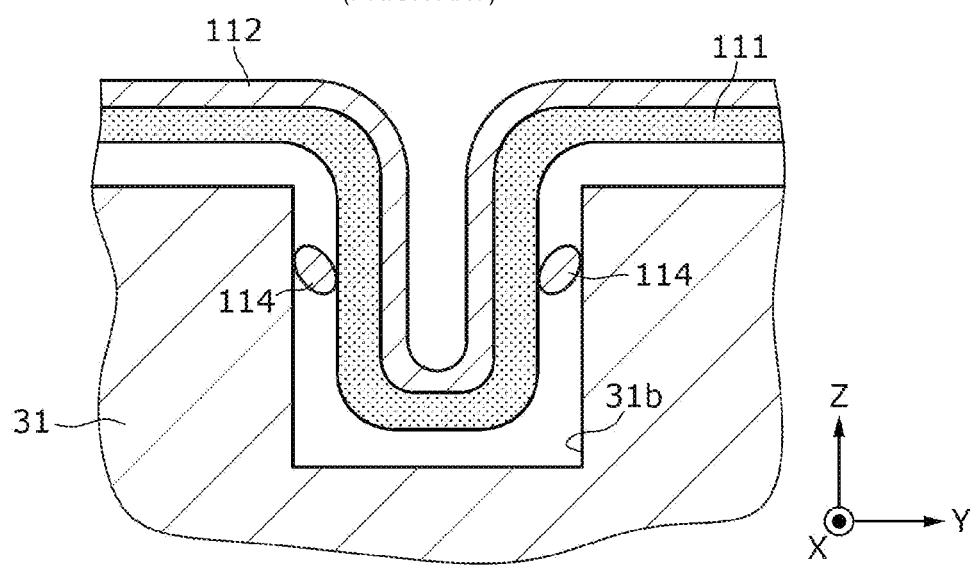
FIG. 7B is a cross-sectional view of the main part of the electrode structure taken along line VIIB-VIIB in FIG. 7A.

Now, the advantages of electrode structure 110 according to the embodiment will be described as compared to electrode structure 200 according to a comparative example. FIG. 6 is a rear view showing electrode structure 200 according to the comparative example. FIG. 7A is a schematic view showing a main part of electrode structure 200 according to the comparative example. FIG. 7B is a cross-sectional view of the main part of electrode structure 200 taken along line VIIB-VIIB in FIG. 7A. In FIG. 7B, adhesive layers 113 and surface layer 115 are not shown.

Electrode structure 200 according to the comparative example differs from electrode structure 110 according to the embodiment in the following point. Conductive wires 114 are arranged substantially at the same wiring density in first areas A1 and in second areas A2.

Specifically, as shown in FIGS. 6 and 7A, electrode structure 200 according to the comparative example includes six conductive wires 114 in first areas A1, and six conductive wires 114 in each of second areas A2 on both the right and left sides of each first area A1. That is, there is no measurement to reduce the wiring density of conductive wires 114 in first areas A1 in electrode structure 200 according to the comparative example. Conductive wires 114 are arranged in base material 111 to simply turn up on both the right and left ends of conductive fabric 112.

As shown in FIG. 7B, being attached to rim 31 of steering wheel 3, the following is found. A larger number of conductive wires 114 are fitted into grooves 31b in electrode structure 200 according to the comparative example than in electrode structure 110 according to the embodiment. Accordingly, in electrode structure 200 according to the comparative example, conductive fabrics 112 may be compressed between conductive wires 114 bent inside grooves 31b and surface layer 115 by conductive wires 114.

On the other hand, in electrode structure 110 according to the embodiment, conductive wires 114 are arranged in base material 111 at a lower wiring density in first areas A1 than in second areas A2.

Accordingly, when being attached to rim 31 of steering wheel 3, the following is found. A smaller number of conductive wires 114 are fitted inside grooves 31b in electrode structure 110 according to the embodiment than in electrode structure 200 according to the comparative example. As a result, in electrode structure 110 according to the embodiment, conductive fabrics 112 are less compressed in grooves 31b between conductive wires 114 and surface layer 115 than in electrode structure 200 according to the comparative example. Less mechanical load is applied to conductive fabrics 112.

In particular, in electrode structure 110 according to the embodiment, conductive wires 114 are arranged in base material 111 at a lower wiring density in third area A3 than in fourth areas A4. Here, conductive fabrics 112 are more concentrated in third area A3 than in fourth areas A4. Accordingly, when conductive wires 114 are arranged at a lower wiring density in third area A3 than in fourth areas A4, much less mechanical load is applied to conductive fabrics 112. In the example of FIG. 5B, in the part of grooves 31b into which the part corresponding to third area A3 of base material 111 is fitted, no conductive wire 114 exists in grooves 31b. No mechanical load is applied onto conductive fabrics 112 by conductive wires 114.

Advantageous Effects

As described above, electrode structure 110 according to the embodiment includes: base material 111; conductive fabric 112 on first surface 111a of base material 111; and conductive wires 114 on second surface 111b so as to be electrically insulated from conductive fabric 112, second surface 111b, which is opposite to first surface 111a, of base material 111. When being attached to rim 31 of steering wheel 3, base material 111 includes: first areas A1 to be fitted into grooves 31b of rim 31; and second areas A2 to be placed in parts of rim 31 other than grooves 31b. Conductive wires 114 are arranged at a lower wiring density in first areas A1 than in second areas A2.

This configuration reduces the number of conductive wires 114 inside groove 31b, when electrode structure 110 is attached to rim 31 of steering wheel 3. In groove 31b, conductive fabrics 112 are less compressed between conductive wires 114 and surface layer 115. This reduces the mechanical load applied onto conductive fabrics 112 by conductive wires 114 easily.

In electrode structure 110 according to the embodiment, when base material 111 is attached to rim 31, each first area A1 further includes: third area A3 on an outer circumference of rim 31; and fourth areas A4 on an inner circumference of rim 31. Conductive wires 114 are arranged at a lower wiring density in third area A3 than in fourth areas A4.

This configuration further reduces the number of conductive wires 114 inside groove 31b in the area in which conductive fabrics 112 are relatively concentrated. This reduces the mechanical load applied onto conductive fabrics 112 by conductive wires 114 more easily.

In electrode structure 110 according to the embodiment, when base material 111 is attached to rim 31, third area A3 includes apex 31c forward of rim 31 and apex 31d rearward of rim 31.

This configuration further reduces the number of conductive wires 114 inside groove 31b in the area which is opposed to a large part of a palm of the driver of vehicle 1 holding rim 31 and in which conductive fabric 112 is relatively concentrated. This reduces the mechanical load applied onto conductive fabric 112 by conductive wires 114 more easily.

In electrode structure 110 according to the embodiment, some conductive wires 114 pass through fourth areas A4, and the others turn up in second areas A2 not to pass through third area A3.

In this configuration, since there is no conductive wire 114 in a part of groove 31b into which the part corresponding to third area A3 of base material 111 is fitted, no mechanical load is applied onto conductive fabric 112 by any conductive wire 114.

Grip sensor 100 according to the embodiment includes: electrode structure 110; and control circuit section 140 that detects a change in a capacitance generated based on conductive fabric 112.

This configuration reduces the number of conductive wires 114 inside groove 31b, when electrode structure 110 is attached to rim 31 of steering wheel 3. In groove 31b, conductive fabric 112 is less compressed between conductive wires 114 and surface layer 115. This reduces the mechanical load applied onto conductive fabric 112 by conductive wires 114 easily.

Variation of Embodiment

Figure 8:
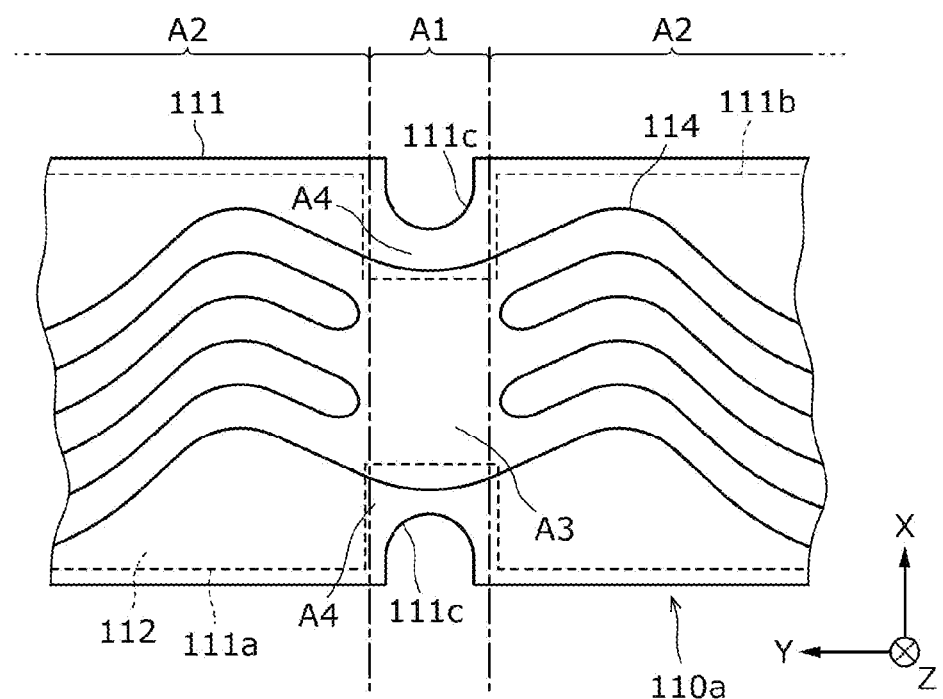
FIG. 8 is a schematic view showing a main part of an electrode structure according a variation of the embodiment.

Now, electrode structure 110a according to this variation has the same basic configuration as electrode structure 110 according to the embodiment. The description of the basic configuration of electrode structure 110a according to this variation will be omitted as appropriate. As shown in FIG. 8, electrode structure 110a according to this variation differs from electrode structure 110 according to the embodiment in the configuration of conductive fabric 112. FIG. 8 is a schematic view showing the main part of electrode structure 110a according the variation of the embodiment.

Specifically, conductive fabric 112 has a smaller transverse size (i.e., along the X-axis) in first areas A1 than in second areas A2. When base material 111 is viewed along the thickness (i.e., along the Z-axis), conductive fabrics 112 exist only in third area A3 of each first area A1 but not in fourth areas A4 of first area A1.

That is, electrode structure 110a according a variation of the embodiment, when base material 111 is attached to rim 31, conductive fabrics 112 on both the sides of groove 31b are connected in third area A3 but not in fourth areas A4.

In this configuration, when the part corresponding to each fourth area A4 of base material 111 is fitted into groove 31b of rim 31 of steering wheel 3, there is no conductive fabric 112 onto which conductive wires 114 apply the mechanical load. Even if there is conductive wire 114 inside groove 31b, conductive fabrics 112 are less compressed by conductive wire 114.

Other Variations

Electrode structures 110 and 110a according to the present disclosure have been described above based on the embodiment and variation. The present disclosure is however not limited to the embodiment and variation. Various modifications made to the embodiment and variation as conceived by those skilled in the art may be included in the scope of the present disclosure without departing from the spirit of the present disclosure.

For example, in electrode structures 110 and 110a according to the embodiment and variation, steering wheel 3 includes two conductive fabrics 112 and two conductive wires 114. Alternatively, steering wheel 3 may include one, there, or more conductive fabrics 112 and one, there, or more conductive wires 114. For example, one base material 111 may include four conductive fabrics 112 to increase the resolution of detecting the grip position on steering wheel 3. On the other hand, the same base material may include only one conductive wire 114 to simplify the configuration of conductive wire 114. The numbers of conductive fabric(s) 112 and conductive wire(s) 114 are not necessarily the same.

In electrode structures 110 and 110a according to the embodiment and variation, conductive wires 114 are metal wires coated with a resin but not limited to this configuration. For example, conductive wires 114 may be metal-plated resin wires.

In electrode structures 110 and 110a according to the embodiment and variation, each conductive wire 114 is used as a heater element capable of detecting a noise signal to a signal detected by conductive fabric 112. Each conductive wire 114 may be however used for other purposes. For example, each conductive wire 114 may be used as a disturbance noise detection electrode. That is, each conductive wire 114 may be a disturbance noise detection electrode for detecting a disturbance noise to an output signal detected by conductive fabric 112. In this case, control circuit section 140 obtains a disturbance noise signal from conductive wire 114 which is the disturbance noise detection electrode. Control circuit section 140 then subtracts a value indicated by the disturbance noise signal from the value indicated by the output signal of conductive fabric 112, for example, to correct the output signal of conductive fabric 112. As a result, control circuit section 140 detects a hand grip on rim 31 more accurately.

In electrode structures 110 and 110a according to the embodiment and variation, conductive wires 114 are directly connected to control circuit section 140, when each conductive wire 114 is used as a heater element or a disturbance noise detection electrode. Conductive wires 114 are however not limited to this configuration. Specifically, the heater element or the disturbance noise detection electrode may be connected via electrode structure 110 or 110a to an external circuit such as control circuit section 140, for example.

In electrode structures 110 and 110a according to the embodiment and variation, each conductive wire 114 does not necessarily have the heating function. Each conductive wire 114 may be simply grounded without allowing any DC current to flow. That is, each conductive wire 114 may function as a shield electrode that blocks a disturbance noise. In this case, there is no need for the two ends of each conductive wire 114 to be electrically and mechanically connected to the pair of connecting terminals 121 to form a closed loop. That is, in place of single conductive wire 114, a plurality of conductive wires 114 may be arranged in base material 111 and grounded.

In electrode structures 110 and 110a according to the embodiment and variation, one base material 111 includes conductive fabrics 112 and conductive wires 114. Base material 111 is not limited to this configuration. For example, a first base material including conductive fabrics 112 and a second base material including conductive wires 114 are bonded into electrode structures 110 and 110a. In this case, the first and second base materials correspond to base material 111.

If each conductive wire 114 is grounded and used as a shield electrode, there is no need to form a closed loop. Only one conductive wire 114 suffices in first areas A1. That is, electrode structures 110 and 110a according to the embodiment and variation, each conductive wire may be grounded. In addition, there may be one conductive wire 114 in first areas A1.

This reduces the mechanical load applied onto conductive fabrics 112 by conductive wires 114 more easily.

Figure 9:
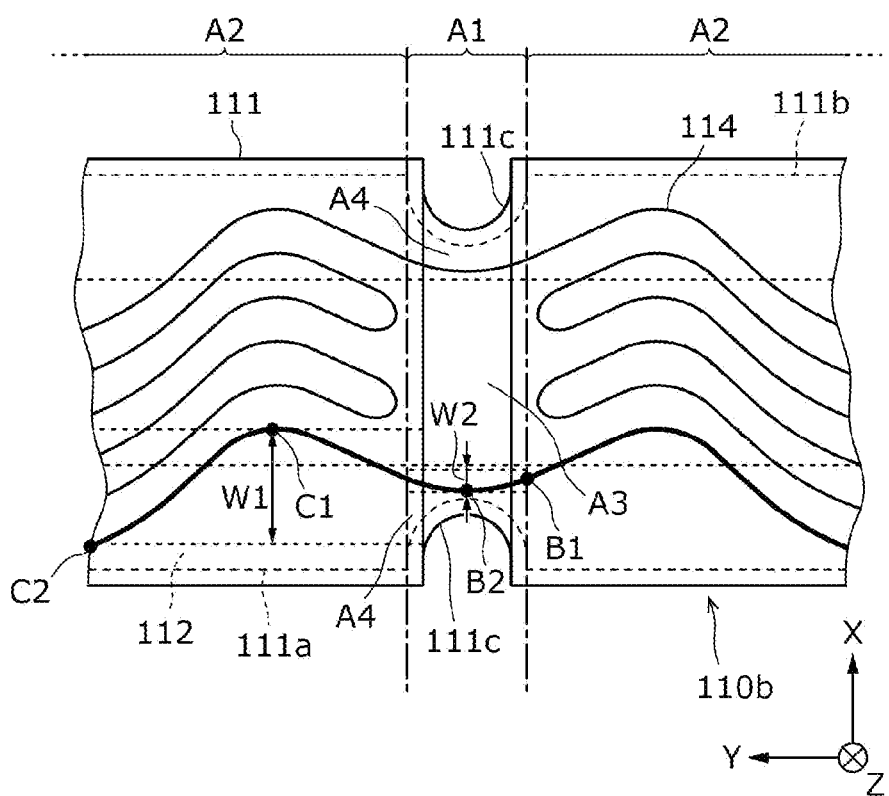
FIG. 9 is a schematic view showing a relationship between conductive wires in fourth areas and in second areas according to the embodiment.

For example, as shown in FIG. 9, conductive wires 114 extend more in parallel with the length (i.e., the Y-axis) of base material 111 in fourth areas A4 than in second areas A2. FIG. 9 is a schematic view showing the relationship between conductive wires in fourth areas A4 and in second areas A2 according to the embodiment.

Specifically, in electrode structure 110b shown in FIG. 9, conductive wires 114 are waved in fourth areas A4 and in second areas A2, when base material 111 is viewed along the thickness (i.e., along the Z-axis).

In electrode structure 110b shown in FIG. 9, amplitude W2 of conductive wires 114 in fourth areas A4 is smaller than amplitude W1 of conductive wires 114 in second areas A2 along the width (i.e., along the X-axis) of base material 111.

More specifically, length (1) is shorter than length (2). Length (1) is the difference between maximum value B1 and minimum value B2 (i.e., amplitude W2=B1−B2) of the phase of one of conductive wires 114 in fourth areas A4 along the width (i.e., along the X-axis) of base material 111. Length (2) is the difference between maximum value C1 and minimum value C2 (i.e., amplitude W1=C1−C2) of the phase of one of conductive wires 114 in second areas A2 along the width (i.e., along the X-axis) of base material 111.

Here, the phase of each conductive wire 114 along the width (i.e., along the X-axis) of base material 111 is defined as follows. The phase decreases as the decreasing distance to the bottom of the paper, and increases as the decreasing distance to the top of the paper. This also applies to FIG. 10 which will be described later.

When base material 111 is attached to rim 31, each fourth area A4 mainly includes a part that is compressed with no tension applied. If conductive wires 114 are more in parallel with the length (i.e., the Y-axis) of base material 111 in fourth areas A4 than in second areas A2, there are less excessive conductive wires 114 in fourth areas A4.

As a result, less excessive conductive wires 114 rise beyond base material 111 in fourth areas A4, which improves the appearance. Since less excessive conductive wires 114 rise beyond base material 111 in fourth areas A4, the hand touch of the user on rim 31 of steering wheel 3 is less influenced.

Figure 10:
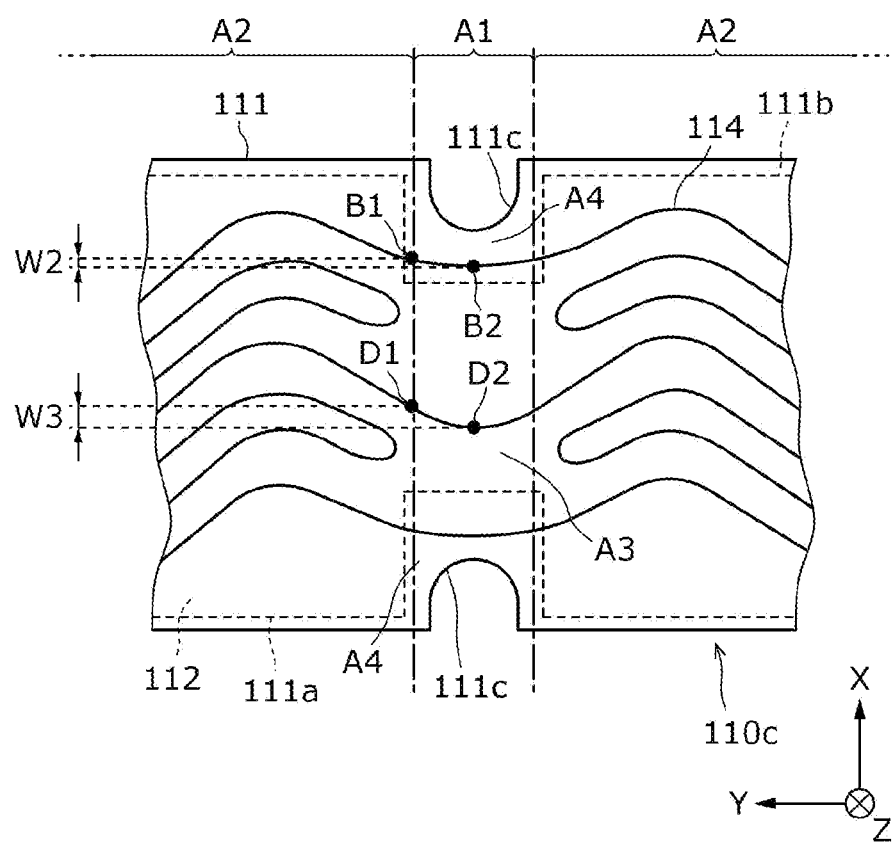
FIG. 10 is a schematic view showing a relationship between conductive wires in the fourth areas and in a third area according the variation of the embodiment.

For example, as shown in FIG. 10, assume that conductive wires 114 are also arranged in third area A3. In this case, conductive wires 114 are more in parallel with the length (i.e., the Y-axis) of base material 111 in fourth areas A4 than in third area A3. FIG. 10 is a schematic view showing the relationship between conductive wires in fourth areas A4 and in third area A3 according a variation of the embodiment.

Specifically, in electrode structure 110c shown in FIG. 10, conductive wires 114 are waved in fourth areas A4 and third area A3, when base material 111 is viewed along the thickness (i.e., along the Z-axis).

In electrode structure 110c shown in FIG. 10, amplitude W2 of conductive wires 114 in fourth areas A4 is smaller than amplitude W3 of conductive wires 114 in third area A3 along the width (i.e., along the X-axis) of base material 111.

More specifically, length (1) is shorter than length (2). Length (1) is the difference between maximum value B1 and minimum value B2 (i.e., amplitude W2=B1−B2) of one of conductive wires 114 in fourth areas A4 along the width (i.e., along the X-axis) of base material 111. Length (2) is the difference between maximum value D1 and minimum value D2 (i.e., amplitude W3=D1−D2) of one of conductive wires 114 in third area A3 along the width (i.e., along the X-axis) of base material 111.

As compared to third area A3, each fourth area A4 mainly includes a part that is compressed with no tension applied, when base material 111 is attached to rim 31. If conductive wires 114 are more in parallel with the length (i.e., the Y-axis) of base material 111 in fourth areas A4 than in third area A3, there are less excessive conductive wires 114 in fourth areas A4. As a result, less excessive conductive wires 114 rise beyond base material 111 in fourth areas A4, which improves the appearance. Since less excessive conductive wires 114 rise beyond base material 111 in fourth areas A4, the hand touch of the user on rim 31 of steering wheel 3 is less influenced.

On the other hand, as compared to fourth areas A4, third area A3 mainly includes a part applied with a tension and fitted into one of grooves 31b of rim 31 to be further applied with a tension, when base material 111 is attached to rim 31. Assume that conductive wires 114 in third area A3 is more inclined from the plane along the length (i.e., the Y-axis) of base material 111 than conductive wires 114 in fourth areas A4. This increases excessive conductive wires 114 in third area A3. As a result, when base material 111 is attached to rim 31, less mechanical load is applied to conductive wires 114 arranged in third area A3.

Note that conductive wires 114 may be arranged more in parallel with the length (i.e., the Y-axis) of base material 111 in fourth areas A4 than in second areas A2 and in third area A3.

The present disclosure includes forms obtained by various modifications to the foregoing embodiments that can be conceived by those skilled in the art or forms achieved by freely combining the constituent elements and functions in the foregoing embodiments without departing from the scope and spirit of the present invention.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-095421 filed on Jun. 7, 2021, and Japanese Patent Application No. 2021-205286 filed on Dec. 17, 2021.

INDUSTRIAL APPLICABILITY

An electrode structure according to the present disclosure is applicable to a grip sensor to be placed on a steering wheel of a vehicle, for example. A grip sensor according to the present disclosure is applicable as a grip sensor to be placed on a steering wheel of a vehicle, for example.

The invention claimed is:

1. An electrode structure comprising:
a base material;
a conductive fabric on a first surface of the base material; and
one or more conductive wires on a second surface of the base material so as to be electrically insulated from the conductive fabric, the second surface being opposite to the first surface of the base material, wherein
the base material includes a first area and a second area, the first area of the base material being fitted into a groove of a rim of a steering wheel and the second area of the base material being placed along a part of the rim other than the groove when the base material is attached to the rim,
the one or more conductive wires are arranged to extend over the first area and the second area, and
the one or more conductive wires are arranged at a lower wiring density in the first area than in the second area.

2. The electrode structure according to claim 1, wherein when the base material is attached to the rim, the first area includes:
a third area on an outer circumference of the rim; and
a fourth area on an inner circumference of the rim, and
the one or more conductive wires are arranged at a lower wiring density in the third area than in the fourth area.

3. The electrode structure according to claim 2, wherein when the base material is attached to the rim, the third area includes an apex forward of the rim and another apex rearward of the rim.

4. The electrode structure according to claim 2, wherein when the base material is attached to the rim, conductive fabrics each being the conductive fabric on both sides of the groove are connected in the third area but not in the fourth area.

5. The electrode structure according to claim 2, wherein some of the one or more conductive wires pass through the fourth area and others turn up in the second area so as not to pass through the third area.

6. The electrode structure according to claim 2, wherein the one or more conductive wires are waved in the fourth area and in the second area as viewed along a thickness of the base material, and
along a width of the base material, the one or more conductive wires have a smaller amplitude in the fourth area than in the second area.

7. The electrode structure according to claim 2, wherein the one or more conductive wires are waved in the fourth area and in the third area as viewed along a thickness of the base material, and
along a width of the base material, the one or more conductive wires have a smaller amplitude in the fourth area than in the third area.

8. The electrode structure according to claim 1, wherein the one or more conductive wires are grounded, and
a total number of the one or more conductive wires in the first area is one.

9. A grip sensor comprising:
the electrode structure according to claim 1; and
a control circuit section that detects a change in a capacitance generated in accordance with the conductive fabric.

10. The electrode structure according to claim 1, wherein the one or more conductive wires in the first area are electrically disconnected from an external circuit.

* * * * *